Dec. 12, 1967 P. S. CROSBY 3,358,155

GATING CIRCUIT HAVING GATING OSCILLATOR WITH INTERNAL TIME DELAY

Filed Oct. 30, 1964

PHILIP S. CROSBY
INVENTOR
BY
BUCKHORN, BLORE, KLARQUIST & SPARKMAN
ATTORNEYS

United States Patent Office 3,358,155
Patented Dec. 12, 1967

3,358,155

GATING CIRCUIT HAVING GATING OSCILLATOR WITH INTERNAL TIME DELAY

Philip S. Crosby, Portland, Oreg., assignor to Tektronix, Inc., Beaverton, Oreg., a corporation of Oregon Filed Oct. 30, 1964, Ser. No. 407,676
8 Claims. (Cl. 307—88.5)

ABSTRACT OF THE DISCLOSURE

The subject matter of the present invention relates generally to electrical circuits for controlling the conduction of a signal gate, and in particular to a gating circuit which causes a gate to transmit a portion of an input signal applied to the input terminal of the gate through such gate to its output terminal when a trigger pulse is applied to a blocking oscillator which produces an output gating pulse for rendering such gate conducting after a predetermined time delay caused within such oscillator. This delayed gating operation enables a trigger pulse, generated in response to an early portion of the input signal applied to the gate, to be used to cause the gate to be rendered conducting to transmit a later portion of the same input signal through such gate.

Figure 1:
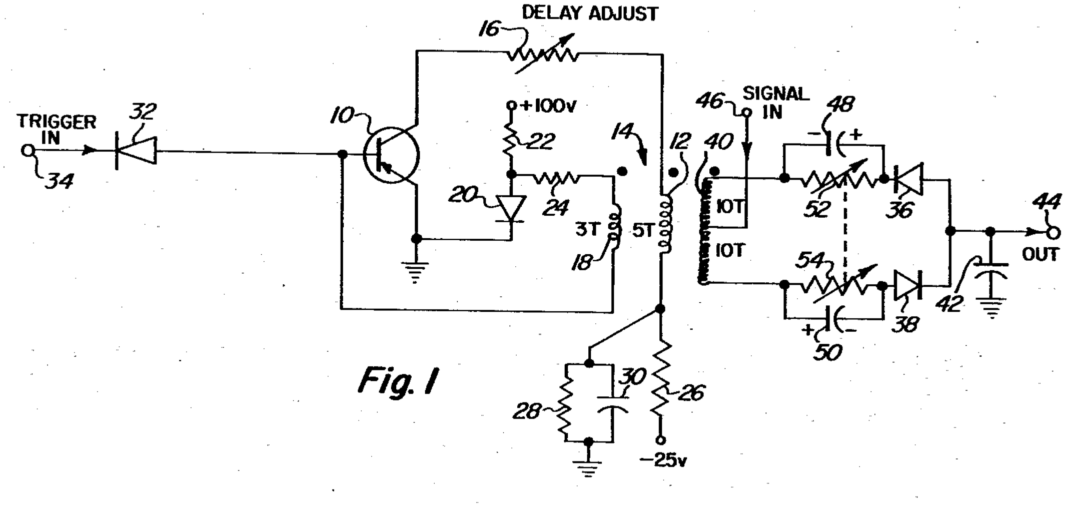

The gating circuit of the present invention is especially useful as a sampling circuit forming part of a "back porch" clamping circuit in a waveform monitor instrument for monitoring the composite video signal of a television transmitter. However, the present gating circuit can also be employed as the memory gate and blocking oscillator of the high frequency signal sampling circuit shown in FIG. 3 of co-pending U.S. patent application, Ser. No. 192,806, filed May 7, 1962, by John R. Kobbe et al. The gating circuit of the present invention has several advantages over previous gating circuits including a simple and inexpensive construction which operates in a more reliable manner. Also the present gating circuit provides an internal time delay between the receipt of a trigger pulse and the "opening" of the gate and eliminates the necessity of an external delay line connected between the source of trigger signals and the trigger input terminal of such gating circuit. In addition, the time delay of the gating circuit of the present invention may be easily adjusted as well as the length of time the gate is rendered conducting.

Briefly, one embodiment of the gating circuit of the present invention includes a transistor having its collector connected to the primary winding of a transformer and its emitter and base connected to the opposite terminals of one secondary winding on such transformer to form a monostable blocking oscillator. A sampling gate including a pair of diodes connected of opposite polarity to the opposite terminals of another secondary winding on the transformer of the blocking oscillator, is provided between a source of input signals and a storage capacitor. The diodes of the sampling gate are reversely biased normally nonconducting and are rendered conducting only after a trigger pulse, generated by the input signal, is applied to the base of the transistor to trigger the blocking oscillator. The polarity of the primary and secondary windings of the transformer is such that the diodes of the sampling gate are only rendered conducting when the transistor returns to its normally nonconducting state from its saturated conducting state so that there is a time delay before the sampling gate is rendered conducting to enable the input signal corresponding to the trigger pulse to be sampled. When the sampling gate is rendered briefly conducting, the portion of the input signal applied to the gate at that time is transmitted through the gate to the storage capacitor as a sample pulse which is stored in such capacitor.

Therefore, it is one object of the present invention to provide an improved gating circuit of simple and inexpensive construction.

Another object of the present invention is to provide an improved gating circuit having an internal time delay between the application of a trigger pulse to such circuit and the rendering of the gate in such circuit conducting.

A further object of the invention is to provide an improved gating circuit in which a blocking oscillator and a sampling gate are employed to provide a signal sampling circuit which operates in a simple and reliable manner.

An additional object of the present invention is to provide an improved sampling circuit having an internal time delay between the application of a trigger pulse and the rendering of a sampling gate conducting in such circuit, such time delay being variable in a simple and accurate manner, as well as the length of time the gate is conducting.

Figure 2:
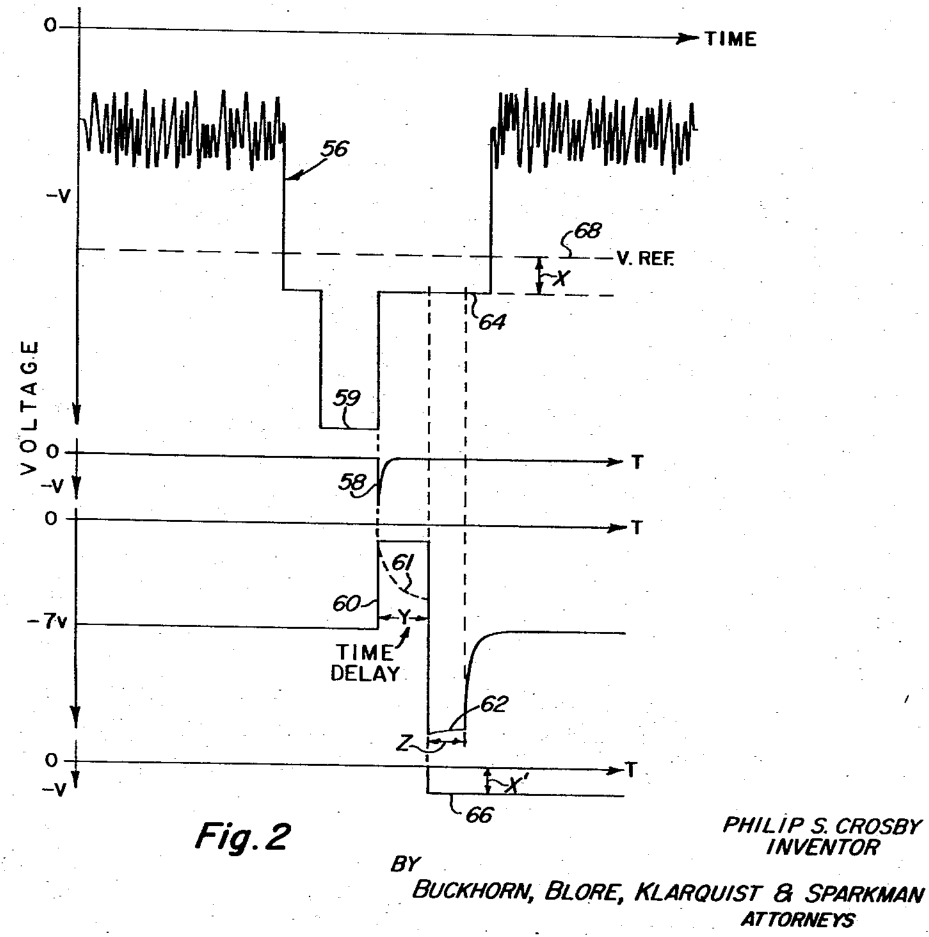

Other objects and advantages of the present invention will be apparent from the following detailed description of a preferred embodiment thereof and from the attached drawings of which:

FIG. 1 is a schematic diagram of one embodiment of the gating circuit of the present invention; and FIG. 2 shows several signal waveforms applied to or produced by the gating circuit of FIG. 1 in time relationship to one another.

One embodiment of the gating circuit of the present invention is shown in FIG. 1 and includes a monostable multivibrator formed in part by transistor 10 which may be of the PNP type shown, such as a 2N967, or of an NPN type if appropriate changes in the polarity of the supply voltages and diodes, etc., are made also. The collector of transistor 10 is connected to one terminal of a five turn primary winding 12 of a transformer 14 through a variable coupling resistor 16 of approximately 30 ohms. A secondary winding 18 of three turns on transformer 14 is connected between the base and emitter electrodes of transistor 10. A diode 20 has its cathode connected to ground in common with the emitter of transistor 10, while the anode of such diode is connected to a source of positive D.C. supply voltage of about +100 volts through a resistor 22 of 1 megohm. The anode of diode 20 is also connected to the secondary winding 18 through a coupling resistor 24 of about 150 ohms so that the D.C. voltage drop across such diode reversely biases the emitter to base junction of transistor 10 and renders it normally nonconducting.

The primary winding 12 is connected to a source of negative D.C. supply voltage of about −25 volts through a load resistor 26 of 18 kilohms. A voltage dropping resistor 28 of 6.8 kilohms in parallel with a bypass capacitor 30 of .2 microfarad, is connected between ground and the common terminal of the primary winding and the load resistor 26 to form a voltage divider network which applies a D.C. voltage of −7 volts to the lower terminal of such primary winding. The transistor 10, transformer windings 12 and 18, diode 20 and resistors 16, 22 and 24 form a monostable blocking oscillator. The blocking oscillator produces an output pulse when a negative trigger pulse is applied to the base of transistor 10 through a coupling diode 32 connected between such base and a trigger input terminal 34 with a polarity to transmit only negative trigger pulses.

A pair of gating diodes 36 and 38 are connected at their cathode and anode, respectively, to the opposite end terminals of another secondary winding 40 on transformer 14 of twenty turns and have their anode and cathode, respectively, connected in common to the upper terminal of a storage capacitor 42 of 100 micromicrofarads whose lower terminal is grounded. An output terminal 44 is connected to the upper terminal of the storage capacitor so that the voltage stored on such capacitor is the output signal of the circuit. The input signals are applied to an input terminal 46 connected to the center tap of the secondary winding 40 in order to transmit the input signals to the cathode of gating diode 36 and to the anode of gating diode 38. The gating diodes are normally reversed biased nonconducting by the D.C. voltages of opposite polarity indicated, which are produced on a pair of coupling capacitors 48 and 50 of .005 microfarad which are connected in parallel with the variable coupling resistors 52 and 54, respectively, each of 220 kilohms in a manner hereafter described.

The operation of the circuit of FIG. 1 will now be described wtih regard to the signals shown in FIG. 2. When the gating circuit is employed in a television waveform monitor, a composite television video signal 56 is applied as the input signal to input terminal 46. A negative voltage trigger pulse 58 is produced in response to the input signal at a time corresponding to the trailing edge of the sync portion 59 of such video signal, and such trigger pulse is applied to the trigger input terminal 34. The negative trigger pulse renders transistor 10 conducting and causes a collector voltage signal 60 to be produced on the collector of such transistor which increases in a positive direction toward the ground potential of the emitter of such transistor. The increase in current through the transistor and the primary winding 12 produces a changing magnetic field which causes a voltage 61, similar to collector voltage 60, to be developed across the primary winding having a positive polarity at the upper terminal of such primary winding indicated by the polarity dot and induces a voltage of similar polarity across secondary windings 18 and 40. The voltage applied across the emitter to base junction of transistor 10 through diode 20 by secondary winding 18 causes base current to flow in such transistor through resistor 24 and acts as positive feedback to increase the conduction of the transistor until such transistor reaches saturation. However, the positive voltage pulse produced across the secondary winding 40 is of such a polarity to merely increase the reverse bias voltage on gating diodes 36 and 38 so that they remain nonconducting and prevent any appreciable flow of current in the secondary winding 40.

As the transistor 10 is driven into saturation, and the current flowing through primary winding 12 no longer increases at its initial high rate, and the voltage 61 on such winding begins to decrease due to the reduced rate of current increase. This causes the induced voltage across the secondary winding 18 to decrease until the emitter to base junction of such transistor is again reversed biased, thereby rendering the transistor nonconducting. When this happens, the current flowing through the primary winding 12 immediately stops, and a negative going voltage pulse is produced across such winding, as well as a corresponding negative going voltage pulse portion 62 of signal 60 on the collector of transistor 10. The decrease in current in the primary winding also induces a similar negative voltage pulse in secondary winding 40 which is applied as a negative gating pulse to the cathode of diode 36 and as a positive gating pulse to the anode of diode 38 to render such diodes conducting at a voltage level corresponding to the bottom of the negative pulse portion 62 and at a time corresponding to the "back porch" portion 64 of the television signal 56. The remaining energy stored in the transformer by primary winding 12 is then dissipated by current flow in the secondary winding 40 through gating diodes 36 and 38 because at this time the transistor 10 and diode 20 are both nonconducting and prevent current flow in windings 12 and 18. A sample voltage 66 is transmitted to the storage capacitor 42 when the sampling gate is rendered conducting if the back porch 64 differs in voltage from a reference voltage 68 stored on capacitor 42 corresponding to the back porch level of the previous input signal. The voltage amplitude X′ of the sample step pulse 66 corresponds to the voltage difference X between the reference voltage 68 of the previous input signal and the voltage of the back porch 64 of the next input signal 56.

The sample voltage 66 is stored in capacitor 42 and transmitted from output terminal 44 as a negative feedback signal to the input of the vertical amplifier (not shown) of the waveform monitor in order to increase or decrease the output signal voltage of such amplifier by the proper amount. In this manner, the average voltage level of the back porch 64 of the output signal of the vertical amplifier can be maintained substantially constant even though the actual level of the back porch varies for different television signals. This enables the waveform monitor apparatus to maintain a stable image of the television signal on the cathode ray tube of such apparatus.

From FIG. 2 it is seen that the time delay Y between the application of the trigger pulse 58 to trigger input terminal 54 and the rendering of the sampling gate conducting by the negative pulse portion 62 of the collector voltage 60, enables the gating circuit of the present invention to sample the average voltage of the back porch 64 without the use of an external delay line between the trigger input terminal and the source of such trigger signal. This time delay Y may be varied by changing the time that it takes the transistor 10 to be driven to saturation and become nonconducting, which may be accomplished by adjusting resistor 16. However, when the variable resistor 16 is set at 15 ohms, this time delay is about 650 nanoseconds when the circuit of FIG. 1 employs the component values indicated above. It should be noted that the length of the time delay Y is directly proportional to the turns ratio of the secondary winding 18 to the primary winding 12, is inversely proportional to the resistance of coupling resistor 16 and is directly proportional to the inductance of the primary winding 12. Therefore, any of these variables may be changed to vary the length of such time delay. In addition, the time delay can be changed slightly by varying coupling resistor 24, but the primary purpose of this resistor is to maintain such time delay uniform regardless of changes in transistor parameters. Of course, the amount of energy stored in the transformer by primary winding 12 during the conduction of transistor 10 determines the amount of energy available for the gating pulse when such transistor is rendered nonconducting so that changes in the inductance in the primary winding 12 or the resistance of coupling resistor 16 also varies the width of the negative portion 62 of such gating pulse.

When the energy stored in the transformer by primary winding 12 reaches zero, current no longer flows through gating diodes 36 and 38 and such diodes are again rendered nonconducting to enable the collector voltage 60 and the primary winding voltage 61 to return to the −7 volts D.C. supply voltage across resistor 28. The voltage drop produced across the coupling resistors 52 and 54, due to the current produced by the negative portion 62 of the gating pulse of the blocking oscillator which rendered the diodes 36 and 38 conducting, is also applied to the coupling capacitors 48 and 50 to charge such capacitors to a D.C. voltage of the polarity indicated. Thus, the D.C. voltage produced on capacitors 48 and 50 reversely biases the gating diodes 36 and 38 and holds them nonconducting. When the diodes 36 and 38 are rendered nonconducting at the termination of the gating pulse, the charge on the capacitors 48 and 50 can only leak off such capacitors through resistors 52 and 54. If the RC time constant of each of the parallel resistor and capacitor biasing networks 48–52 and 50–54 is sufficiently large compared to the repetition frequency of the input signal applied to input terminal 46 and of the trigger pulse applied to trigger input 34, sufficient charge will always remain upon the capacitors from the preceding gating pulse to normally reversely bias the gating diodes 36 and 38 nonconducting until the production on the next gating pulse regardless of the small change in voltage on the storage capacitor 42.

The length of time Z that the sampling gate 36–38 is rendered conducting may be changed by controlling the amount of reverse bias voltage applied to gating diodes 36 and 38 by capacitors 48 and 50, and this may be accomplished by varying the resistance of coupling resistors 52 and 54 in a similar manner by ganging the movable contacts of these resistors. The width Z of the gating pulse 62 is about 400 nanoseconds for the component values indicated when coupling resistances 52 and 54 are set at their maximum value of 220 kilohms.

It will be obvious to those having ordinary skill in the art that many changes may be made in the details of the above-described preferred embodiment of the present invention without departing from the spirit of the invention. For example, a four diode gate can be employed merely by connecting a second pair of diodes similar to diodes 36 and 38 in parallel therewith and by moving the connection of the input terminal 46 to the common terminal of such additional diodes in order to provide a diode bridge. Furthermore, resistors 16 and 24 may be eliminated if a larger variation in time delay due to different transistor parameters is permissible. In addition, the self-biasing RC networks 48–52 and 50–54 may be replaced by a pair of batteries or other D.C. voltage sources, and voltage divider network 26, 28, 30 can be replaced by a D.C. voltage source of −7 volts. Also, the trigger pulses 58 can be derived from the leading edge of the sync portion 59 of the input signal, and such trigger pulses can be applied to the emitter or collector of the transistor 10 to trigger the monostable blocking oscillator. In addition, an astable blocking oscillator can be employed rather than a monostable oscillator by replacing diode 20 with a capacitor and changing the D.C. voltage source connected to resistor 22 from +100 volts to a negative voltage, and the repetition rate of such astable oscillator is synchronized with the trigger pulses applied to transistor 10. Therefore, the scope of the present invention should only be determined by the following claims.

I claim:

1. A gating circuit comprising:
a monostable blocking oscillator;
sampling gate means connected to said oscillator, for transmitting a portion of an A.C. input signal applied to the input terminal of said gate means through the gate means to its output terminal when said gate means is rendered conducting by an output gating pulse produced by said oscillator;
bias means for rendering said gate means normally nonconducting; and
delay means within said oscillator for causing said oscillator to produce the output gating pulse only after the oscillator is triggered, driven into a saturated conducting state and returned to a nonconducting state so that there is a time delay between the application of a trigger pulse to said oscillator and the production of the output gating pulse which renders said gate means conducting.

2. A gating circuit in accordance with claim 1 in which the delay means is adjustable to vary the time delay.

3. A gating circuit, comprising:
a signal translating device having input, output and common electrodes;
a transformer having a primary winding and a pair of secondary windings;
means connecting said primary winding to the output of said device and for connecting one of said secondary windings between said input and common electrodes of said device in a manner to form a blocking oscillator;
gate means connected across the other of said second windings;

bias means for applying D.C. bias voltages to render said device and said gate means normally nonconducting;
means for applying an input signal to the input terminal of said gate means;
means for applying a trigger pulse to said input electrode of said device to render said device momentarily conducting and to trigger said oscillator; and
delay means within said oscillator for causing said device to return to its normal nonconducting state from its triggered conducting state before said blocking oscillator produces an output gating pulse across said other secondary winding which renders said gate means momentarily conducting after a predetermined time delay with respect to the application of said trigger pulse to said device.

4. A sampling circuit comprising:
a signal translating device having input, output and common electrodes;
a transformer having a primary winding and a pair of secondary windings;
means connecting said primary winding to the output electrode of said device and for connecting one of said secondary windings between said input and common electrodes of said device in a manner to form a monostable blocking oscillator;
sampling gate means connected across the other of said second windings;
bias means for applying D.C. bias voltages to render said device and said gate means normally nonconducting;
energy storage means connected to the output terminal of said gate means;
input means for applying an input signal to the input terminal of said gate means;
trigger means for applying a trigger pulse to said input electrode of said device to render said device momentarily conducting; and
delay means within said oscillator for causing said device to saturate and to return to its normal nonconducting state before said blocking oscillator produces an output gating pulse across said other secondary winding which renders said gate momentarily conducting after a predetermined time delay with respect to the application of said trigger pulse to said device so that a sample portion of said input signal is transmitted through said gate to said storage means.

5. A sampling circuit comprising:
a signal translating device having input, output and common electrodes;
a transformer having a primary winding and a pair of secondary windings;
means connecting said primary winding to the output electrode of said device and for connecting one of said secondary windings between said input and common electrodes of said device in a manner to form a monostable blocking oscillator;
sampling gate means connected across the other of said second windings;
bias means for normally biasing said device and said gate means normally nonconducting;
energy storage means connected to the output terminal of said gate means;
means for applying an input signal to the input terminal of said gate means;
means for applying a trigger pulse to said input electrode of said device to render said device momentarily conducting;
delay means within said oscillator for causing said device to saturate and to return to its normal nonconducting state before said blocking oscillator produces an output gating pulse across said other secondary winding which renders said gate momentarily conducting after a predetermined time delay with respect to the application of said trigger pulse to said device so that a sample portion of said input signal is transmitted through said gate to said storage means; and means for varying said time delay.

6. A gating circuit comprising:

a transistor having emitter, collector and base electrodes;

means for biasing said transistor normally nonconducting;

a transformer having a primary winding and a pair of secondary windings;

a first coupling resistance connected between the collector of said transistor and said primary winding;

a coupling diode connected between one terminal of one of said secondary windings and the emitter of said transistor, with the other terminal of said one secondary winding being connected to the base of said transistor to form a monostable blocking oscillator;

gate means connected between the opposite terminals of the other secondary winding and having its output connected to the output terminal of said gating circuit;

bias means for normally biasing said gate means nonconducting;

input means for applying input signals to the input of said gate means;

trigger means for applying trigger pulses to the input of the transistor to trigger said blocking oscillator by rendering said transistor conducting; and delay means within said oscillator for causing the transistor to saturate and to subsequently become nonconducting again before said oscillator produces an output gating pulse which is applied to the gate means to render said gate means briefly conducting after a time delay with respect to the application of said trigger pulse to said transistor.

7. A gating circuit comprising:

a transistor having emitter, collector and base electrodes;

means for biasing said transistor normally nonconducting;

a transformer having a primary winding and a pair of secondary windings;

a variable first coupling resistance connected between the collector of said transistor and said primary winding;

a coupling diode connected between one terminal of one of said secondary windings and the emitter of said transistor, with the other terminal of said one secondary winding being connected to the base of said transistor to form a monostable blocking oscillator;

a second coupling resistance connected between said diode and said one secondary winding;

a pair of gating diodes of opposite polarity connected to the opposite terminals of the other secondary winding and to the output terminal of said gating circuit;

a pair of biasing networks each including a resistance in parallel with a capacitance, with a different one of said biasing networks being connected between said other secondary winding and said gating diodes to normally bias said gating diodes nonconducting;

input means for applying input signals to a center tap terminal on said other secondary winding; and trigger means for applying trigger pulses to the base of the transistor to trigger said blocking oscillator by rendering said transistor conducting; and delay means within said oscillator for causing the transistor to saturate and to subsequently become nonconducting again before said oscillator produces an output gating pulse which is applied to the gating diode to render said gating diodes briefly conducting after a time delay with respect to the application of the trigger pulse to said transistor to transmit a portion of said input signal through said gating diodes to said output terminal, said time delay being variable by adjustment of said first coupling resistance.

8. A sampling circuit comprising:

a transistor having emitter, collector and base electrodes;

means for biasing said transistor normally nonconducting;

a transformer having a primary winding and a pair of secondary windings;

a variable first coupling resistance connected between the collector of said transistor and said primary winding;

a coupling diode connected between one terminal of one of said secondary windings and the emitter of said transistor, with the other terminal of said one secondary winding being connected to the base of said transistor to form a monostable blocking oscillator;

a second coupling resistance connected between said diode and said one secondary winding;

a storage capacitor;

a pair of gating diodes of opposite polarity connected to the opposite terminals of the other secondary winding and to a common terminal of said storage capacitor;

a pair of biasing networks each including a variable resistance in parallel with a capacitance, with a different one of said biasing networks being connected between said other secondary winding and said gating diodes to normally bias said gating diodes nonconducting;

input means for applying input signals to a center tap terminal on said other secondary winding;

trigger means for applying trigger pulses to the base of the transistor to trigger said blocking oscillator by rendering said transistor conducting; and delay means within said oscillator for causing the transistor to saturate and to subsequently become nonconducting again before said oscillator produces an output gating pulse which is applied to the gating diode to render said gating diodes briefly conducting after a time delay with respect to the application of the trigger pulse, and said transistor to transmit a sample portion of said input signal through said gating diodes to said storage capacitor, said time delay being variable by the adjustment of said first coupling resistance and the width of said sample portion being variable by adjustment of the resistances of said biasing networks.

References Cited

UNITED STATES PATENTS

| | | | |
|---|---|---|---|
| 3,002,110 | 9/1961 | Hamilton | 331—112 |
| 3,038,026 | 6/1962 | Mothersole | 178—7.3 |
| 3,088,096 | 4/1963 | Steinbuch | 307—88.5 |
| 3,145,263 | 8/1964 | Barnard | 178—7.3 |

ARTHUR GAUSS, *Primary Examiner.*

D. D. FORRER, *Assistant Examiner.*